United States Patent
Purcell et al.

(10) Patent No.: US 7,212,959 B1
(45) Date of Patent: May 1, 2007

(54) METHOD AND APPARATUS FOR ACCUMULATING FLOATING POINT VALUES

(76) Inventors: Stephen Clark Purcell, 365 Preston Dr., Mountain View, CA (US) 94040; Scott Kimura, 2178 Paseo Del Oro, San Jose, CA (US) 95124; Mark L. Wood Patrick, 1494 Ormsby Dr., Sunnyvale, CA (US) 94087

( * ) Notice: Subject to any disclaimer, the term of this patent is extended or adjusted under 35 U.S.C. 154(b) by 895 days.

(21) Appl. No.: 09/925,161

(22) Filed: Aug. 8, 2001

(51) Int. Cl.
*G06F 7/62* (2006.01)

(52) U.S. Cl. .......................... 703/13; 703/14; 703/15; 708/524; 708/495; 708/620; 708/629; 712/220; 712/221; 712/222

(58) Field of Classification Search .................. 703/13, 703/14–22; 708/524, 629, 620, 495; 712/220–225
See application file for complete search history.

(56) References Cited

U.S. PATENT DOCUMENTS

| | | | | |
|---|---|---|---|---|
| 4,622,650 A | * | 11/1986 | Kulisch | 708/603 |
| 5,053,631 A | * | 10/1991 | Perlman et al. | 708/508 |
| 5,220,524 A | * | 6/1993 | Hesson | 708/502 |
| 5,666,116 A | * | 9/1997 | Bakhmutsky | 341/67 |
| 5,928,316 A | * | 7/1999 | Wong et al. | 708/501 |
| 5,937,202 A | * | 8/1999 | Crosetto | 712/19 |
| 6,286,023 B1 | * | 9/2001 | Purcell et al. | 708/620 |
| 6,351,806 B1 | * | 2/2002 | Wyland | 712/225 |
| 6,401,194 B1 | * | 6/2002 | Nguyen et al. | 712/210 |
| 6,446,104 B1 | * | 9/2002 | Tzeng et al. | 708/503 |
| 6,535,901 B1 | * | 3/2003 | Grisamore | 708/629 |
| 6,571,268 B1 | * | 5/2003 | Giacalone et al. | 708/524 |
| 2002/0039386 A1 | * | 4/2002 | Han et al. | 375/240.16 |
| 2002/0194240 A1 | * | 12/2002 | Pangal et al. | 708/501 |

OTHER PUBLICATIONS

"Accelerating Pipelined Integer and Floating-Point Accumulations in Configurable Hardware with Delayed Addition Techniques", Luo et al, IEEE Transactions on Computers, vol. 49, No. 3, Mar. 2000.*
"Architectures for Pipelined Wallace Tree Multiplier-Accumulators", Pang, IEEE CH2909-0/90/0000/0247, IEEE 1990.*

* cited by examiner

*Primary Examiner*—Fred Ferris
(74) *Attorney, Agent, or Firm*—Townsend and Townsend and Crew LLP

(57) ABSTRACT

A method and apparatus for accumulating arbitrary length strings of input values, such as floating point values, in a layered tree structure such that the order of adds at each layer is maintained. The accumulating utilizes a shared adder, and includes means for directing initial inputs and intermediate result values.

30 Claims, 6 Drawing Sheets

METHOD AND APPARATUS FOR ACCUMULATING FLOATING POINT VALUES

BACKGROUND

1. Field of the Invention

The invention relates generally to arithmetic logic units. More specifically, the invention relates to arithmetic logic units capable of accumulating floating values.

2. Related Art

One of the most basic arithmetic operations utilized in information processing devices is that of accumulation of a series of values. Accumulation at its most basic is implemented by use of a memory, such as a register, and an adder device. For instance, FIG. 1 shows a multiply-and-accumulate (MAC) device 100 that accumulates products resulting from the multiplying of two input values. MAC device 100 includes a multiply unit 110 that provides the product of two input values as its output. MAC device 100 also includes an adder unit 120 that provides the sum of two values as its output. Each product resulting from multiply unit 110 is summed with an accumulated total stored in an accumulator 130. The output of the adder unit 120 is sent to the accumulator 130 which keeps a running total of the additions. One common problem with such basic configurations as MAC 100 is that a new product results from multiply unit 110 much faster than the time for the previous product to pass through the adder unit 120 and be accumulated. MAC 100 would work better if the adder unit 120 operated in only a single cycle. However, as is often the case, the adder units themselves are multi-cycle in nature and thus, if the inputs are to be fed in the proper time, delay elements must be introduced in the system.

FIG. 2 exemplifies the conventional use of a multi-cycle adder unit which is controlled by the introduction of intentional delay elements. The MAC 200 of FIG. 2 provides for multi-cycle adder latency by introducing a delay element 215. The multiply unit 210 provides the product of two input values to a delay element and to a MUX (multiplexor) 219. Multiplexor 219 selects between the output of the previous accumulate stored in memory MEM 218 and the current, non-delayed product result. The output of the delay element 215 forms the first of two inputs to another MUX 217. MUX 217 selects either the output of the delay element 215 or the accumulated value of a previous cycle stored in memory MEM 216. The output of MUX 217 and MUX 219 are summed by add unit 220, and then sent to memories 216 and 218.

FIG. 3 illustrates a conventional accumulator design using a tree adder. The adder-accumulator structure 300 uses an adder tree prior to the accumulate stage to compensate for the delay in the accumulate cycle. The tree adder takes inputs in groups of 4 on a given cycle. Two of the 4 inputs are summed by an adder unit 304 while the other two are summed by a parallel adder unit 306. The outputs of the adder 304 and the adder 306 are summed by an adder 310. The output of adder 310 is passed to the final adder unit 320 and summed with the accumulated value (of previous adds) stored in accumulator 330. The delay through the adders 304, 306 and 310 allow the accumulator to act in phase with the multiply units (not shown) providing the initial adds.

The adder-accumulator structure 300 is a balanced "tree" that works best if the inputs to be accumulated are in fixed groups of 4. If the inputs to be accumulated are less or more than 4 in number and not divisible thereby, then zeroes would need to be added through the adders as appropriate. This creates more adds than are necessary and slows performance. Further, if the inputs break in an uneven manner, where for instance, inputs belonging to one logical string are added by inputs of another logical string, the structure must stall the accumulator until the proper inputs for each string are completed.

Consider the summing and accumulation of 6 inputs, A, B, C, D, E and F. In a tree adder such as that illustrated in FIG. 3, the inputs A and B would be summed in one cycle, and in parallel the inputs C and D would be added. On the next cycle, the result of A+B and C+D would be summed together and sent to the adder 320. However, since there are actually a total of six inputs to accumulate, the inputs E and F would have to be added on the second cycle (when the results of the first cycle are being summed by adder 310) along with a pair of zeroes. This results in a extra number of additions than would ordinarily be required. If only three inputs A, B and C were to be accumulated together, then some logic would have to insert a zero to prevent input D from being summed along with A, B and C. Where the grouping of inputs is arbitrary and not well known, it is difficult using conventional designs to prevent slow results.

Worse still, the results provided by such adder-accumulator structures may be inaccurate. This occurs where the addition is not strictly associative in nature. Floating point add operations are examples of such operations that are not necessarily associative. This is due to the nature of floating point adds, which consider FIG. 4 shows the add order of a balanced tree adder-accumulator. The results A+B, C+D and E+F can be performed in any order and even simultaneously since their outputs do not depend on each other. Thus at a layer 410 all of these preliminary adds can be performed. At the second layer 420, the result of A+B is summed with the result of C+D computed from layer 410. On layer 420, since E+F does not need to be summed yet with any other result, passes down to the third layer 430. The result of the layer 420 adds are summed with the E+F result of layer 410 at the third layer 430. The resultant of these adds is in the grouped order ((A+B)+(C+D))+(E+F). The single-cycle adder without delay elements would result in the grouped order of adds ((((A+B)+C)+D)+E)+F. When adding floating point values, the two methods may produce different results. While the single-cycle add method is cost-effective and slow, each add depending upon the result of the previous add, the tree adder method is more efficient in that dependencies are reduced.

In floating point add operations, the grouping of inputs that need to be accumulated may be constantly and arbitrarily changing. The first three inputs may need to be accumulated, then the next six, then the next two, then the next three and so forth. Since it is impractical to cover all such situations by restructuring a tree adder for each or by building a tree adder for each case, there needs to be a floating add solution that can make use of fixed structure that also preserves the order of adds and allows for arbitrary grouping thereof. Therefore, a method and apparatus for accumulating an arbitrary length string of inputs is desired which can minimize the number of adders while maintaining the correct order of operations.

SUMMARY

The invention consists of constructing and implementing a programmable adder-accumulator that is capable of accumulating an arbitrary-length string of input values in a layered tree fashion and do so while maintaining the correct order of operations. The invention utilizes a shared adder and enables the length of the string to be arbitrarily large and changing at each string.

In some embodiments, the adder-accumulator is programmed by the use of control fields tracking the layer, routing and cycle type of the various initial inputs and intermediate result values. In some embodiments, the order of adds is maintained by storing intermediate add results in a partitioned memory bank. The partitioning of the memory bank simulates the number of layers and right-left branch directions of the layered tree.

DETAILED DESCRIPTION OF THE INVENTION

In brief, the invention consists of constructing and implementing a programmable adder-accumulator that is capable of accumulating an arbitrary-length string of input values in a layered tree fashion and do so while maintaining the correct order of operations. Ensuring the order of operations maintains predictability and consistency of the outputted sum when the adder-accumulator accumulates a given string of values, such as floating point values. The sum of a current string should not depend upon the processing of a previous string of values which may affect the scheduling of inputs for the current string. The programmability of the adder-accumulator, as described below, enables an efficient accumulation of values despite the length of the string (i.e. the total number of values) to be accumulated. Such an adder-accumulator enables the length of the string of values to be accumulated to be arbitrary and capable of being different for each such string.

Figure 5:
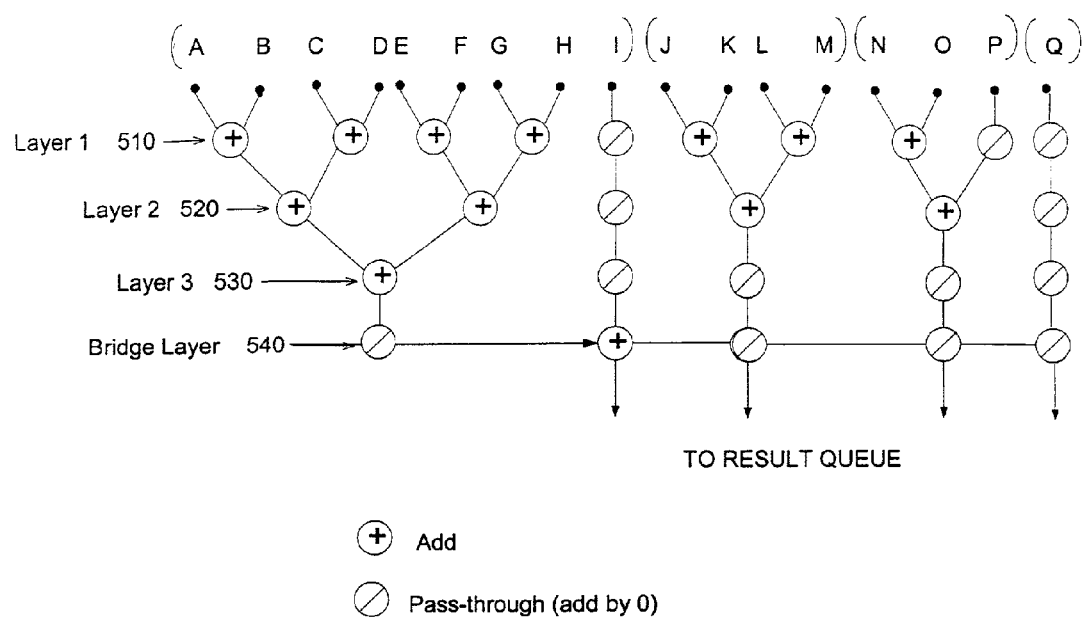
FIG. 5 illustrates grouping of inputs and the layer-bridge adding schema implemented by various embodiments of the invention.

FIG. 5 illustrates grouping of inputs and the layer-bridge adding schema implemented by various embodiments of the invention. The adder-accumulator schema 500 of FIG. 5 illustrates a grouping of inputs A through P into different "strings" of values which are to be accumulated together. The schema groups, for instance, a string of 9 inputs—A, B, C, D, E, F, G, H and I—together for summing and accumulation. The schema groups the next 4 inputs, namely, J, K, L and M, into the third string of values to be accumulated and groups the next, 3 inputs, namely, N, O and P, together to form the final string of values for summing and accumulation. The final grouping is a string of length 1, and thus, only 1 input value Q.

Figure 1:
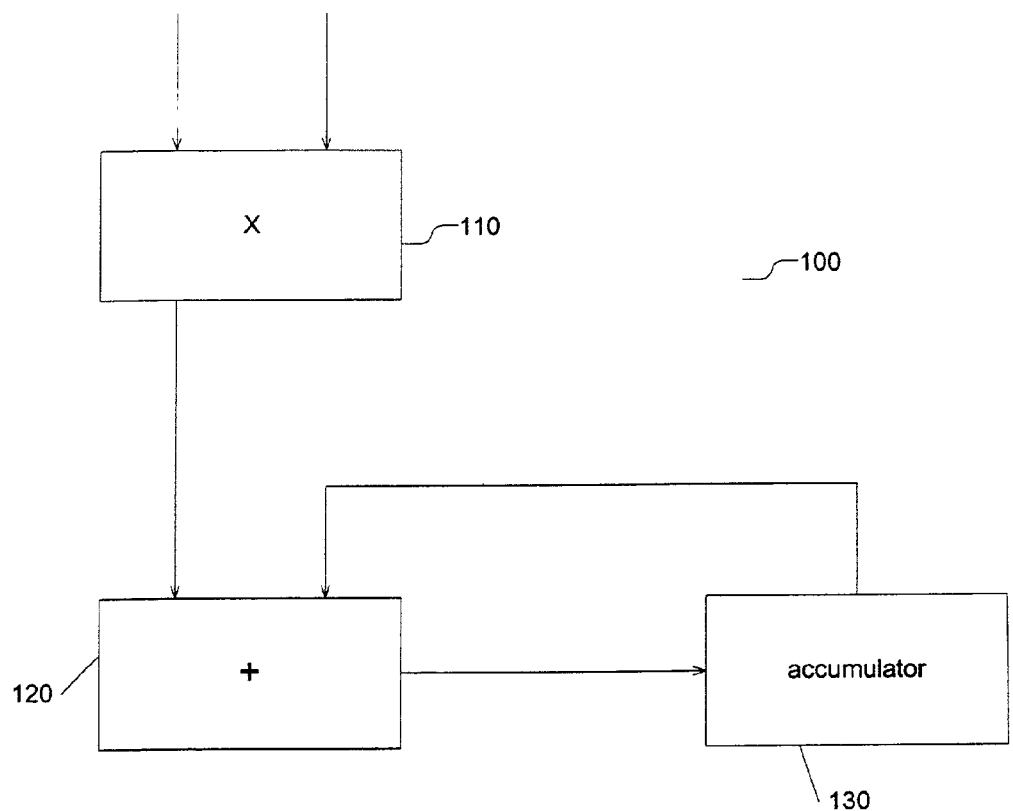
FIG. 1 shows a conventional multiply-and-accumulate (MAC) device that accumulates products resulting from the multiplying of two input values.
Figure 2:
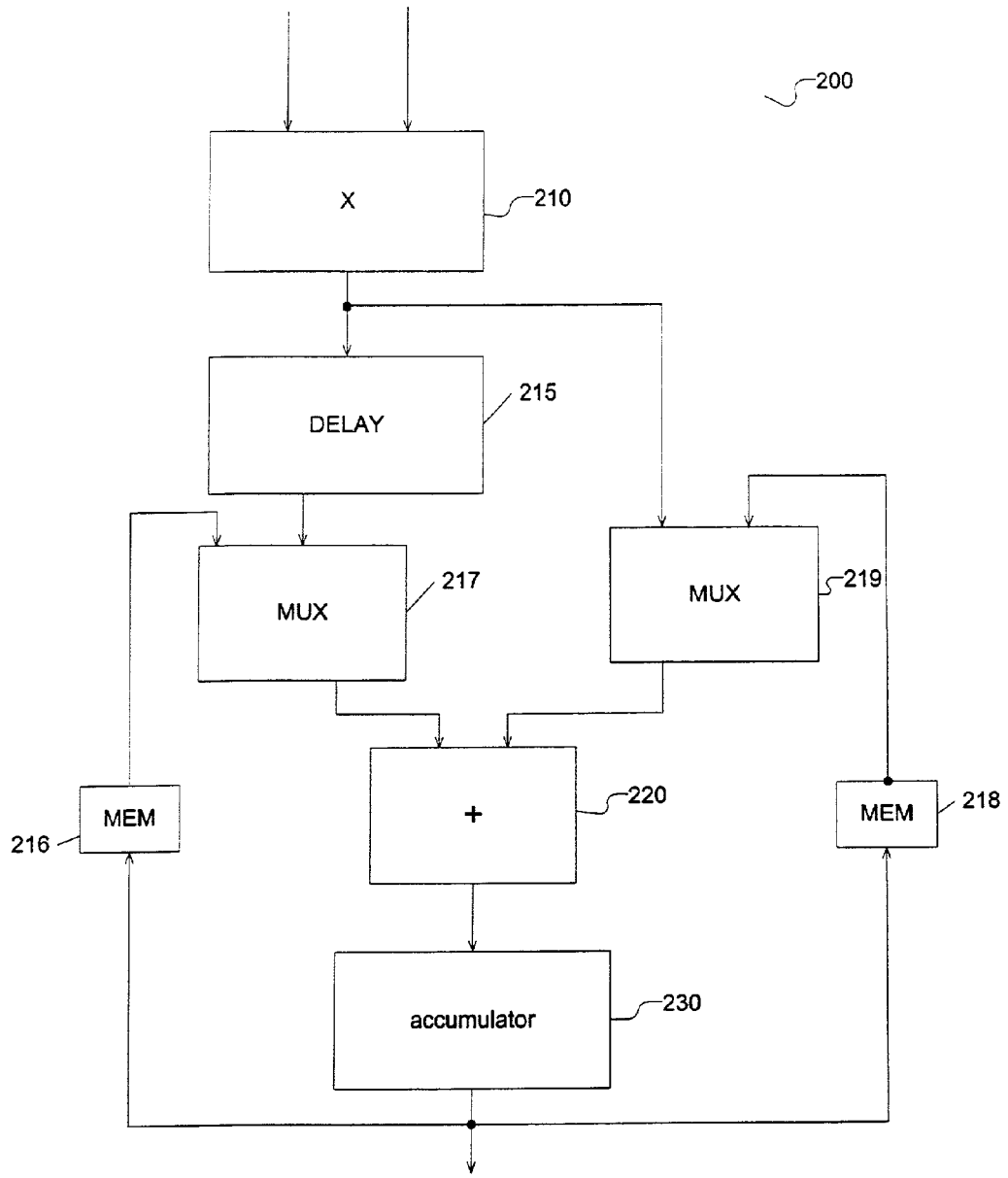
FIG. 2 exemplifies the conventional use of a multi-cycle adder unit which is controlled by the introduction of intentional delay elements.
Figure 3:
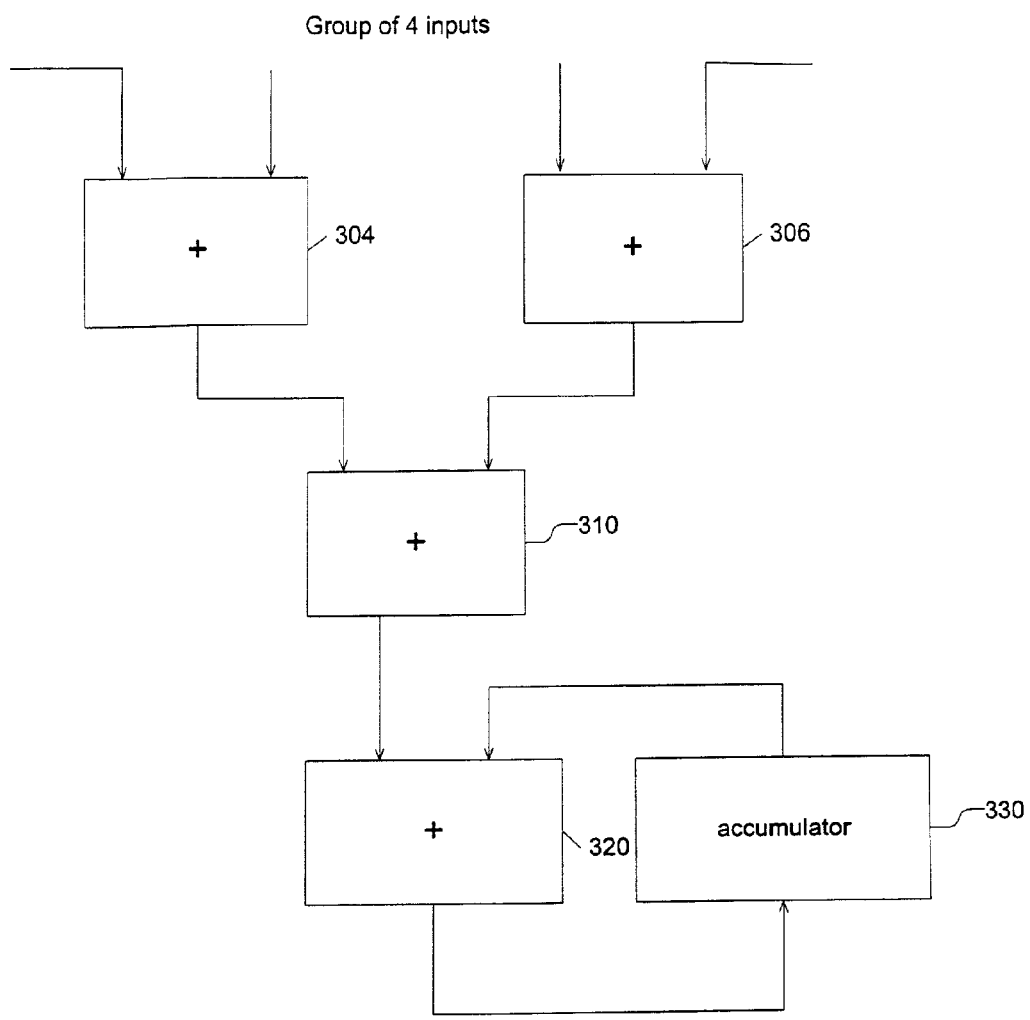
FIG. 3 illustrates a conventional accumulator design using a tree adder.
Figure 4:
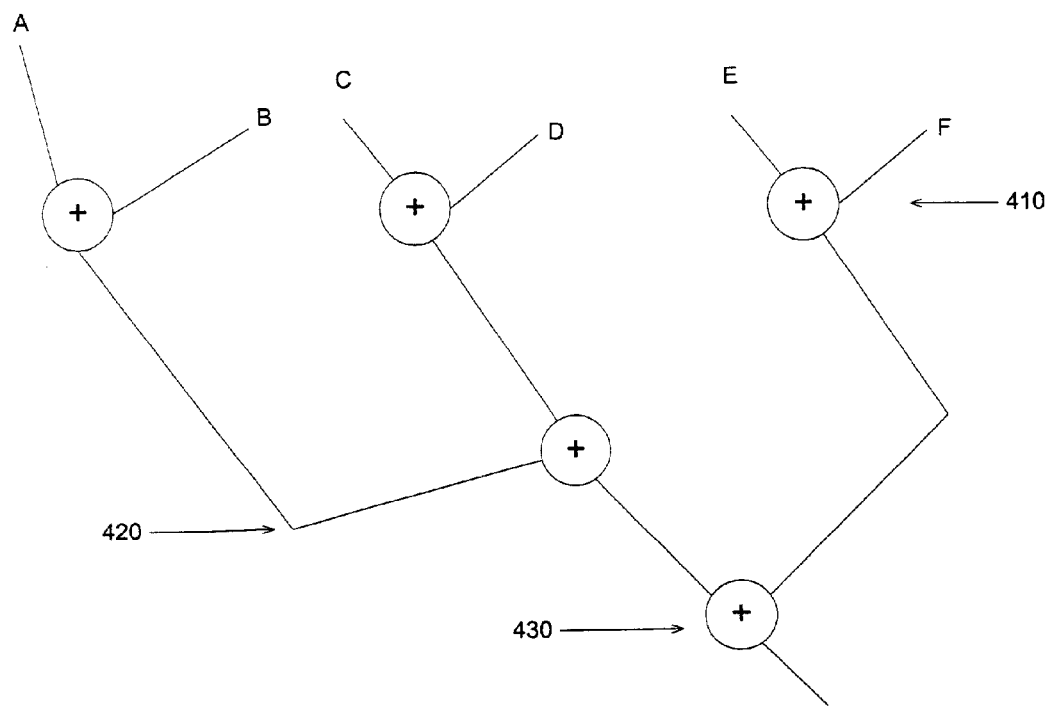
FIG. 4 shows the add order of a balanced tree adder-accumulator.

Each of these four strings of values are of a different length. The first string has a length 9 while the next has a length 4, the next a length of 3 and the final string a length of 1. Considering all of the add operations in their various "layers" gives each individual string of input values its own tree structure. For instance, considering a first layer 510, the first string of 9 values are added by first considering the eight inputs A–h in a sequential even manner by 4 adds of 2 operands each. In layer 510, A and B are summed, C and D are summed, E and F are summed and G and H are summed. In the second layer 520, for the first string of values, the results of A+B and C+D are summed in one operation while the results of E+F and G+H are summed in another parallel operation. In the third and final operational layer 530, the 2 results of the layer 2 520 summations are summed together. The result is output on a bridge layer 540 which provides a bus for the final add of I, the ninth input in the string, with the rest of the string. The final result is a sum that takes on the ordering (A+B)+(C+D)+(E+F)+(G+H)+I. This ordering would contrast ordering of 8 single cycle adds implemented by the repeated use of the structure of FIG. 1 which would be (((((((A+B)+C)+D)+E)+F)+G)+H)+I). The string length of 9 for the first string yields in part a "balanced" (even number of right branch and left branch add operations at each layer) binary tree through the three layers when considering the first eight inputs, and then a bridge layer add for the ninth input.

The next string has a length of 4, and thus groups together input values J, K L and M. At the first layer 510, J and K are summed in one add operation and L and M are summed in another add operation. At the second layer 520, the result J+K is summed with the result L+M in a single add operation. Since all of the adds are complete as of layer 520, the result of layer 520 is passed through layer 530 without further operation. Again, if the same grouping of 4 input values were attempted to be accumulated in a structure implementing a balanced binary tree for a string of weight values, at least half the operations would be un-necessary. Even though the length 4 could lead to implementation in a balanced binary tree, the length is not evenly divisible by 8 and thus, potentially incompatible with a tree structure for a length of 8. Worse still is the case of an unbalanced binary tree that would be optimal in the case of the final string of length 3 depicted in FIG. 5. At layer 1, N and O are summed in one operation while the value of P is passed through to the next layer. The result of N+O and P are then summed t layer 2 520. This result is passed through layer 3 530 since all the input values have already been accumulated together.

The next string only includes one value, namely, Q. Instead of adding any invalid value, such as a not zero, to the input value, the value Q is "passed through" only one layer 510 with an add of zero being performed, and then sent to the result queue. This case shows that an inefficient adder-accumulator would waste many clock cycles and perform many adds if implemented in the same structure as that of the string of say 8 values.

Duplicating such a variety of balanced and unbalanced trees in conventional adder-accumulators would require the use of a separate physical structure for each possible string length, or alternatively, a physical structure accommodating the largest possible string length which then inserts zeroes when accumulating strings of less than the largest length. The invention, in various embodiments, discloses the use of a programmable adder-accumulator that is capable of implementing the various exemplary tree structures needed to efficiently perform the grouped accumulation of values shown in FIG. 5.

The invention uses partitioned memory banks of FIFOs (First-In First-Out buffers) and depending upon the length of the string to be accumulated, routes and re-routes intermediate and final result values as needed. The programmable adder-accumulator simulates a tree structure by including a left partition memory bank and right partition memory bank. A number of FIFOs are contained in each memory bank, and the total number of FIFOs depends upon the total number of layers desired. In function, the programmable adder-accumulator maintains the desired order of operations by preserving the order of adds within a given layer but not necessarily between one layer and the next. This is because the adds from different layers can be performed in any order with respect to each other. The string length may be arbitrarily large, and adds of such large length strings is implemented by including an additional FIFO to represent the bridge layer add. In this way, there may be more FIFOs in one of the memory bank partitions than the other.

The number of layers needed in the programmable adder-accumulator of the invention does not depend upon the maximum possible length of the input string being accumulated. Rather, the latency of the adder device used determines the structure of the tree. By including a bridge layer, the length of the input string can be arbitrarily large, since the bridge layer simply adds new inputs to the previous tree generated sum. The number of layers required for an adder with a latency of 5–8 cycles would be three operational layers plus one bridge layer, for a total of four layers. One implementation of a programmable adder-accumulator with three operational layers and one bridge layer according to the invention is described below.

Figure 6:
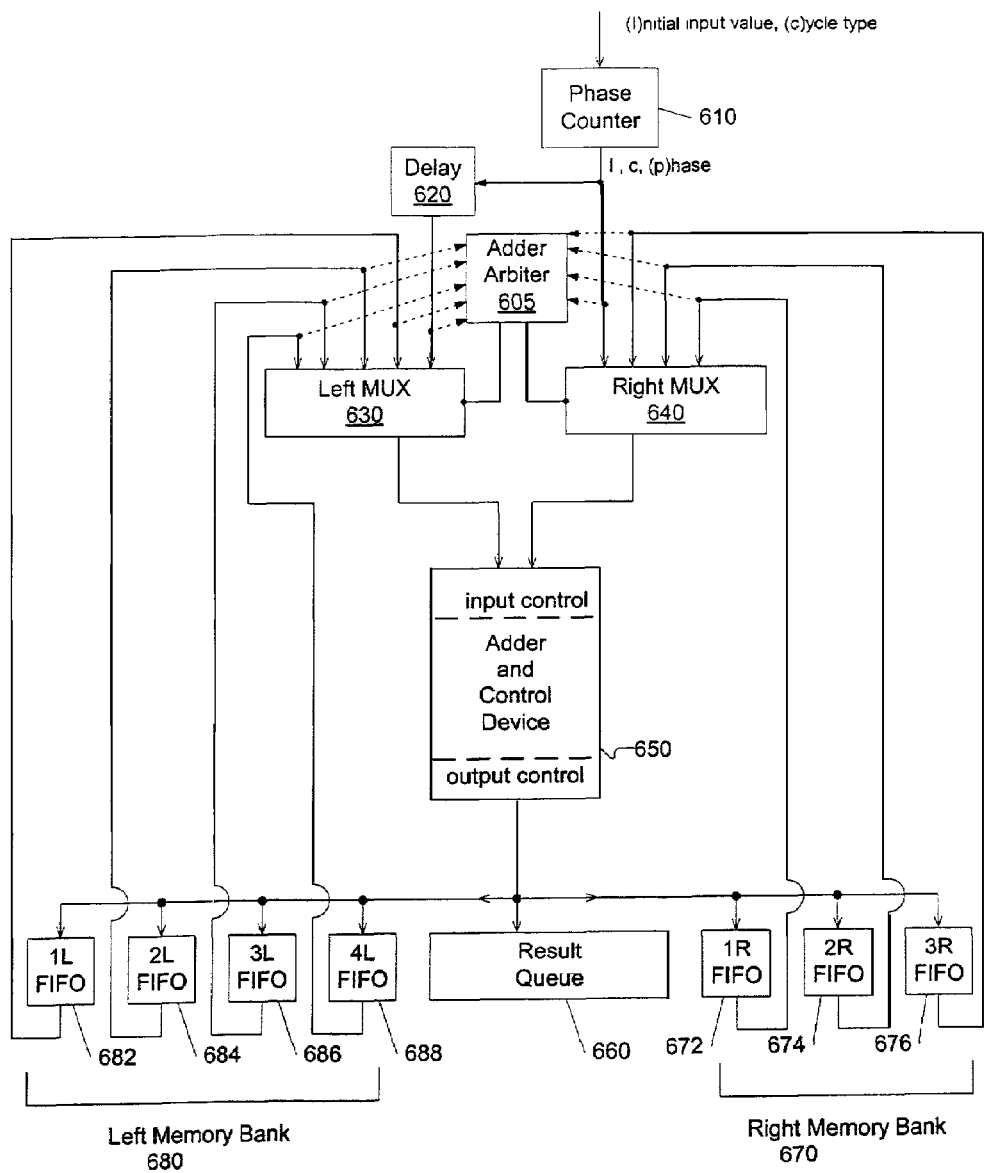
FIG. 6 illustrates an exemplary programmable adder-accumulator (PA) according to at least one embodiment of the invention.

FIG. 6 illustrates an exemplary programmable adder-accumulator (PA) according to at least one embodiment of the invention. A counter device, such as a phase counter 610, tracks the phase of the input values being accumulated and provides for each, a phase count. At the start of each string, the phase counter 610 is reset (set to zero) and begins incrementing for each input value. If a string exceeds a length of $2^k$, where k is the number operational layers in the tree, then the phase counter wraps around to zero and generates a wrap bit or flag. The programmable adder-accumulator (PA) 600 of FIG. 6 receives a stream of input values, such as floating point values. Each input value having an odd phase is provided to the right side of the PA 600 without delay. Each input value to be accumulated having an even phase is provided to a left side of the programmable adder-accumulator (PA) 600 after being delayed by a delay element 620. This ensures that the streamed initial input values will arrive in simultaneous pairs to the PA 600. The phase counter 610 enables the delay element 620 on even phase counts and disables it on odd phase counts, allowing the initial input on those odd phase counts to pass directly without delay. The phase counter 610 is being used in a three operational layer tree, and therefore, will wrap when the phase count is 7 (counts to 8, from 0 to 7).

The selection of which input values and intermediate result values that are to be added together is made by a left MUX (multiplexor) 630 and a right MUX 640. The left MUX 630 selects one of the input/intermediate result values from among the ones provided by delay element 620 and by a left memory bank 680. The right MUX 640 selects one of the input/intermediate result values from among the ones provided through count device 610 and by a right memory bank 670. An adder arbiter 605 has logic providing the a select control signal to each of the MUXs 630 and 640. An adder and control device 650 sums the value provided by left MUX 630 with the value provided by right MUX 640. The adder and control device 650 includes three interconnected components—an adder, input control and output control.

The input control ensures that the adder sums two valid values and when necessary, allows the input supplied by left MUX 640 to pass without alteration. The output control determines where in the memory banks 670 and 680 or the result queue 660, the result of the add operation is to be stored or directed.

Specifically, the left memory bank 680 includes a series of memories configured as four FIFOs 1L 682, 2L 684, 3L 686 and 4L 688. Each of these FIFOs 1L 682, 2L 684, 3L 686 and 4L 688 provide one of the four intermediate result values of the left memory bank 680 that are input to left MUX 630. Along with the delayed initial input value from delay 620, left MUX thus selects one of five values. Likewise, the right memory bank 670 includes a series of memories configured as three FIFOs 1R 672, 2R 674, and 3R 676. Each of these FIFOs 1R 672, 2R 674, and 3R 676 provide one of the three intermediate result values of the right memory bank 660 that are input to right MUX 640. Along with the input value from count 610, right MUX 640 thus selects one of four values. The final result of accumulating the string of input values is provided to a result queue 660. The PA 600 exemplifies a tree structure of 4 layers (3 operational layers and a fourth bridge layer) and thus, would wrap the phase counter 610 at a value of 8. The fourth, bridge layer only has a left FIFO (4L FIFO 688) because the result of the bridge layer always goes either there for an additional add or directly to the result queue 660. The fourth or bridge layer add is performed either between the FIFOs 3L 686 and 3R 676 or between the FIFOs 4L 688 and 3R 676. An adder arbiter 605 monitors the five left MUX 630 sources and the four right MUX 640 sources. Based on control fields (discussed below) that accompany the data of these sources, the adder arbiter 605 provides a select signal for the left MUX 630 and the right MUX 640.

The PA 600 is programmed and data through it flow controlled by utilizing three control fields, namely, a cycle type field, routing field and layer field. In one implementation of the memory banks 670 and 680, the various control fields can be used as an addressing mechanism for reading/writing to a shared RAM (Random Access Memory) which performs the function of the FIFOs in each of the memory banks. Each of the control fields are described as follows.

Cycle Type

The cycle types are 4 in number and can thus be represented by two bits. The cycle type is one of the main fields used to control the flow of data through the PA 600. The cycle type "00" indicates a normal accumulation. The cycle type "01" indicates that the start of a string of initial input values is occurring. The cycle type "10" indicates that the value is at the end of the string. Finally, a cycle type of "11" indicates that the accumulation process is done for a particular string. When a cycle type of 11 is encountered, the output control of adder and control device 650 directs the sum output by adder and control device 650 to the result queue 660. In the case of a string of length 1, it is coded as done (cycle type 11) since it both the start and end of the string, and merely needs to be pipelined to the result queue 660. The cycle type accompanies the initial input values from the string being accumulated and is generated by the grouping logic deciding the length and starting positions of strings to be accumulated. When the cycle type is done ("11") or end ("10"), the phase counter 610 is reset to zero.

TABLE 1

Cycle Type

| Cycle type | Description |
|---|---|
| 00 | Normal accumulation |
| 01 | Start of string |
| 10 | End of string |
| 11 | Done |

Routing Field

The routing field is generated by a considering both the phase count from phase counter 610 and the cycle type accompanying the initial input values. The phase count, for the exemplary PA structure 600 depicted in FIG. 6, would wrap at a value of 8 (and thus, consist of three bits) and would generate an extra bit to indicate whether the counter has wrapped for the current string of input values (i.e. the string length is greater than 8). The routing field contains one bit for every operational (non-bridge) layer of the tree being implemented. For instance, referring to PA 600, three operational layers are implemented, and therefore the routing field generated would be three bits, one bit for each layer. A bit value of "0" ("L" in Table 2) in the routing field indicates that the output result of the adder and control device should be directed to a FIFO of the left memory bank 680. A bit value of "1" ("R" in Table 2) in the routing field indicates that the output result of the adder and control device should be directed to a FIFO of the right memory bank 670. The last or least significant bit of the routing field represents layer 3, the second bit represents layer 2 and the most significant or first bit represents layer 1. Table 2 below illustrates the values of the routing field as observed from the cycle type and phase count. The routing field is essentially "abc" where "a" is bit 2 of the phase count, "b" is the most significant bit of the phase count and "c" is the wrap indication bit.

In addition to the routing field, a delay-enable can also be generated for each input value. The delay-enable indicates whether the string input values are to pass to the right MUX 640 or to the left MUX 630 after being delayed by delay 620. If the phase count of the input value is even, the delay-enable will be high (yes), the delay 620 will be enabled, and the input value will be sent after delay to the left MUX 630. If the phase count of the input value is odd, the delay-enable will be low (no), the delay 620 will not be enabled, and the input value will be =sent directly to right MUX 640.

TABLE 2

Routing Field, Delay-Enable

| Phase | Wrap bit | Cycle type | Delay (layer 0) | Layer 1 FIFO | Layer 2 FIFO | Layer 3 FIFO |
|---|---|---|---|---|---|---|
| 0 | 0 | Start | Y | L | L | L |
| 0 | 0 | Done | Y | L | L | L |
| 1 | 0 | Normal | N | L | L | L |
| 1 | 0 | End | N | L | L | L |
| 2 | 0 | Normal | Y | R | L | L |
| 2 | 0 | End | Y | R | L | L |
| 3 | 0 | Normal | N | R | L | L |
| 3 | 0 | End | N | R | L | L |
| 4 | 0 | Normal | Y | L | R | L |
| 4 | 0 | End | Y | L | R | L |
| 5 | 0 | Normal | N | L | R | L |
| 5 | 0 | End | N | L | R | L |
| 6 | 0 | Normal | Y | R | R | L |
| 6 | 0 | End | Y | R | R | L |
| 7 | 0 | Normal | N | R | R | L |
| 7 | 0 | End | N | R | R | L |
| 0 | 1 | Normal | Y | L | L | R |
| 0 | 1 | End | Y | L | L | R |
| 1 | 1 | Normal | N | L | L | R |
| 1 | 1 | End | N | L | L | R |
| 2 | 1 | Normal | Y | R | L | R |
| 2 | 1 | End | Y | R | L | R |
| 3 | 1 | Normal | N | R | L | R |
| 3 | 1 | End | N | R | L | R |
| 4 | 1 | Normal | Y | L | R | R |
| 4 | 1 | End | Y | L | R | R |
| 5 | 1 | Normal | N | L | R | R |
| 5 | 1 | End | N | L | R | R |
| 6 | 1 | Normal | Y | R | R | R |
| 6 | 1 | End | Y | R | R | R |
| 7 | 1 | Normal | N | R | R | R |
| 7 | 1 | End | N | R | R | R |

A routing field of "L" refers to the left memory bank 680, and a bit value of "0" while "R" refers to the right memory bank 670 and a bit value of "1".

Layer Field

The layer field indicates what layer the data belongs to. Since there are only 3 operational layers (with a fourth bridge layer) the layer field needs only two bits. The layer field is used to select appropriate routing bit from the routing field and then the destination FIFO is designated in that bit of the routing field (L or R). Data which is directly from the string of input values is given a layer field of "00". Intermediate result data in layer 1 FIFOs have a layer field of "01". Intermediate result data in layer 2 FIFOs have a layer field of "10". Intermediate result data in layer 3 FIFOs have a layer field of "11". The layer field does not need to be stored or sent to the FIFOs and could be generated in the MUXs since the FIFO of origin is ported to the MUXs directly. The three control fields—the cycle type, routing field and layer field—can be generated and stored in a look-up table or can be implemented variously as logic circuitry. The layer field is incremented within the adder and control device 650 whenever a previous layer add is completed. The layer field for each right and left inputs to the adder and control device 650 will be the same with the possible exception of the bridge layer add. This is since the order of adds of the same layer is sought to be strictly maintained. The layer field can be maintained in the adder and control device 650 by reference to the cycle type, and incremented as needed. Alternatively, the layer field can accompany every piece of data as it makes its way throughout the PA 600.

TABLE 3

Layer Field

| Layer Field | Meaning |
|---|---|
| 00 | Cycle from Initial Input Values |
| 01 | Cycle from layer 1 FIFOs |
| 10 | Cycle from layer 2 FIFOs |
| 11 | Cycle from layer 3 FIFOs |

Data Flow Control

The adder arbiter 605 provides the selector signal for the MUXs 630 and 640. The adder arbiter 605 observes the five left side sources (from the left memory bank 680 and the delayed initial input values) and the four right side sources (from the right memory bank 670 and from the initial input values). The adder arbiter then uses the control fields accompanying these sources to determine which of the sources should be selected. An input control within adder and control device 650 combines the control fields from the right and left MUXs 630 and 640. Each cycle, the input control accepts a pair of inputs from the MUXs 630 and 640. Normally, the adder portion of adder and control device 650 requires a pair of inputs, one from the left and one from the right. However, if the left MUX 640 provides an input with a cycle type of done ("11") or end ("10"), then no right input is required, since no other valid input remains to be accumulated. If there is a residual input supplied by right MUX 640 and a left cycle type of done, then the adder and control device 650 uses a zero as the right input so that the adder and control device 650 will not alter the value of the input supplied by left MUX 630 input through a summation with a potential non-zero right MUX 640 supplied input. The left and right sources are combined in the adder and control device 650. The single resultant sum value that is output will have a combined set of control fields that takes into account the right and left control fields and cycle types. The rules for adder control fields resulting from combining the right and left sources are shown in Table 4 below.

TABLE 4

Adder Result Control Fields

| Left Cycle Type | Right Cycle Type | Resulting Cycle Type | Resulting Cycle Control Fields |
|---|---|---|---|
| Start | Normal | Start | Left |
| Start | End | Done | Right |
| Normal | Normal | Normal | Left |
| Normal | End | End | Right |
| End | * | End | Left |
| Done | * | Done | Left |

*An end or done in the left lane means that the cycle should be passed to the next layer. Do not pop the right FIFO. Use 0 instead of the right value.

The resulting cycle types specify what cycle type should accompany the resultant sum from the adder and control device 650. The resulting cycle control fields determine which of the layer and routing fields should accompany the resultant sum. For instance, if the left source has a cycle type of "Start" and the right source has a cycle type of "Normal," then the resulting cycle type for the adder result will be "Start". The routing control field for the resultant data will be those of the left input source. An End or Done cycle type in the left control field indicates a pass-through stage and thus, the input control will use a) for the right value and use the control field accompanying the left source for the pass-through result.

The adder and control device 650 sums the left and right source inputs supplied by the MUXs 630 and 640 in accordance with above data flow control rules. The output result is directed to one of the FIFOs by the output control portion of adder and control device 650. The adder result control fields (which are given by Table 4, above)—cycle type, routing field and layer field—are used by the output control to make the determination of where the output result of the summation by the adder is to be directed. The rules for output result data flow control are shown in Table 5 below. The output control can stall the adder in case the result queue has a stall and the destination of the output result is the result queue rather than one of the FIFOs.

TABLE 5

Result Destinations

| Adder cycle type | Adder routing | Adder layer | Destination |
|---|---|---|---|
| Start/Normal/End | 0XX | 0 | 1L |
| Start/Normal/End | 1XX | 0 | 1R |
| Start/Normal/End | X0X | 1 | 2L |
| Start/Normal/End | X1X | 1 | 2R |
| Start/Normal/End | XX0* | 2 | 3L |
| Start/Normal/End | XX1* | 2 | 3R |
| Start/Normal/End | XXX | 3 | 4L |
| Done | XXX | X | RQ |

*The third routing bit is the wrap bit from Table 2. "X" represents don't care bits. RQ is the Result Queue 660.

The adder result cycle type, the adder result routing field and the layer field are used by the output control to direct the sum from the adder and control device 650 to one of eight possible destinations. For instance, if the left source routing field is "100", the right is "001", the adder layer is "1" and the cycle types are "Normal" for each source, then according to Table 4, the resulting cycle type would be "Normal" and the left source routing field "100" would be selected as the adder routing. Since the adder layer is "1", from Table 5, therefore, the destination for the add would be the left FIFO 2L 684. A "Done" result cycle type will always send the result to the result queue 660.

For example, consider the exemplary grouping of 17 input values A–P into four sequential strings of length 9, 4, 3 and 1. Taking each string in order, the first string has a length of 9, and groups input values A, B, C, D, E, F, G, H and I, which has phase counts of 0, 1, 2, 3, 4, 5, 6, 7 and 8 (wraps to 0), respectively. The first of inputs A will pass through phase counter 610 which counts its phase as 0. Thus, the input A would have a phase 0 and a wrap bit of 0 and the cycle type would be start ("01"). With an even phase, the delay-required designator would be "Y", and thus the input A would pass through delay 620 and on the next cycle, be sent to left MUX 630. The next input B has a phase of 1, and a cycle type of Normal ("00") and a wrap bit of 0. Due to its odd phase, the delay-required designator would be "N" and the input would pass directly to the right MUX 640. Each of the inputs A and B is accompanied by a layer field of "00". Despite any values that may residually reside in the FIFOs, the only valid inputs for the MUXs 630 and 640 are the inputs A and B. Since the layer is "00," the adder arbiter 605 directs the left MUX 630 to select the initial input value A, and the right MUX 640 to select the initial input value B. The input control of the adder and control device 650 combines the left input cycle type of "Start" with the right input cycle type of "Normal" to yield a resulting cycle type Start, and resulting cycle control fields of "Left". The adder and control device 650 sums the inputs A and B. The result A+B has a adder routing field "000" (from the Left source) and is a intermediate result value for a future add in layer 1, so the output control, according to Table 5 directs the result A+B to the 1L FIFO 682.

The next initial input C would arrive having a phase of "2", a cycle type of Normal, and a delay-required designator of "Y" passing it to the delay 620 and then the left MUX 630, awaiting the arrival of the next cycle's input. The next string initial input D would have a phase of "3", a cycle type of Normal, and a delay-required designator of "N" passing it directly to right MUX 640. The layer field would still be "00" (since a cycle type of Done was not encountered) but the routing field becomes "100" (RLL) for both inputs. The inputs C and D would then be passed to adder and control device 650 by the MUXs 630 and 640. The input control permits the add operation, and the output control would direct the result C+D to the 1R FIFO 672, given the layer of "00" and routing field of "100" (see Table 5).

The next set of inputs E and F have phases of 4 and 5, respectively, wrap bits at "0", cycle types of Normal, a layer field of "00" and a routing field of "010" (LRL). The adder and control device 650 would sum these inputs E and F. From Table 4, the resulting cycle type is Normal and the resulting control fields are "Left". Thus, according to Table 5, the output control of the adder and control device 650 would direct the result E+F to the FIFO 1L 682. At this point, FIFO 1L 682 would have queued up the result of A+B, and next in priority, the result of E+F. The right FIFO 1R 672 has queued up C+D, and all other FIFOs would have no valid values for the currently being accumulated string (they may have residual values from prior string accumulations).

The seventh and eighth initial inputs from the string, namely, G and H, have phases of 6 and 7, respectively, wrap bits at "0", cycle types of Normal, and routing fields of "110" (RRL). Input G would be delayed until input H can arrive, as in the previous cases. The layer field is still held at "00" (0). The adder and control device 650 would again sum the initial inputs G and H. According to Table 4, the resulting cycle type is Normal and the resulting control fields are from the Left source. Thus, the adder result routing would be "110" which at a layer field of 0 would place the result, according to Table 5, in layer 1 FIFO 1R 672. The FIFO 1R 672 would queue the result G+H behind the previously stored result C+D.

The next input, I, is the ninth and final input in the string. Since the phase counter only counts up to 8 input values, the phase counter resets to "0" but at the same time, now generates a wrap bit of "1". In theory, the input I should be summed at the fourth or bridge layer. The input I has a cycle type of "End" (indicating the end of the string). The delay enable is set to high, and thus the input I will pass to the left MUX 630 after a delay of one cycle. According to Table 2, the routing field for this left source would be "001" (LLR). According to Table 4, a cycle type of End in the left source, indicates that a resulting cycle type of End and the routing field of the Left source is to be used as the result the summation. The layer field is still "00". Instead of taking a value from a right FIFO, or input source, a "0" is used as the right source. The result I+0 is directed by the output control, according to Table 5, to the FIFO 1L 682.

The PA 600 has now completed adds in layer 0 for the first string of initial input values, storing the results therefrom in various FIFOs. Rather than ignore the input stream and continue performing adds at higher layers for the first input string, the newly arriving initial input values take priority in the adder. The layer 0 mode of the PA 600 is maintained during the adds at this layer. The layer 0 adds for the other input values are performed in a like manner as that described above. If there are periods of inactivity for the adder, where the second of pair of inputs from the initial input stream needs to arrive, then the next layer add may be performed in the interim.

After all layer 0 adds are performed (for all of the input strings), the PA can be switched into layer 1. In this mode, the PA 600 performs adds from layer 1 FIFOs. Referring to the first input string, the layer 0 adds resulted in layer 1 left FIFO 1L 682 having at least in part, in first-in order, the result of A+B, the result of E+F, and the result of I+0 (or merely, I). Likewise, the layer 1 right FIFO 1R 672 contains, at least in part, in first-in order, the result of C+D and then the result of G+H. The first input to the left MUX 630 from FIFO 1L 682 is the result of A+B. The corresponding input to the right MUX 640 is the result of C+D. From the discussion above, the result of A+B, which is the left source selected by the adder arbiter 605, has a cycle type of Start, and a routing field of "000" (LLL). Likewise, the adder arbiter 605 selects a right source of C+D, which has a cycle type of "Normal" and a routing field of "100" (RLL). According to Table 4, the resulting cycle type will be Start, and the resulting routing field "000" (LLL). The adder and control device 650 then computes the sum of (A+B)+(C+D). the output control would direct the result, according to Table 5, to the layer 2 left FIFO 2L 684.

In a like manner, the MUXs 630 and 640 would provide, respectively, the results E+F and G+H, to the adder and control device 650. After performing the sum of (E+F)+(G+H), the output control of adder and control device 650 would direct the sum to the right layer 2 FIFO 2R 674. This is because the left source (Normal cycle type, and routing field of "010" (LRL)) combines with the right source (Normal cycle type, and routing field "110" (RRL)) to give a resulting cycle type through the adder of Normal, and a resulting routing field of "010". The result value I+0 which is next in the left FIFO 1L 682 would still carry a cycle type of End, and thus, the input control would add 0 to I+0, once again, passing it through the layer 1 unaltered thereby. The right FIFO would not be popped, accordingly, and therefore, maintain its intermediate result value which might belong to another input string. The result (I+0)+0 or still merely "I" would be directed by the output control to the layer 2 left FIFO 2L 684. In a like manner, all other layer 1 adds and pass-throughs (by adding 0, when needed) can be completed as depicted in FIG. 5.

The layer 2 left FIFO 2L 684 would hold, at least in part, the result of (A+B)+(C+D) and the result of (I+0)+0, in first-in order. Likewise, the layer 2 right FIFO 2R 674 would hold the result of (E+F)+(G+H). The layer 2 results would then be added together as part of a layer 3 add by the PA 600. The left source (to left MUX 630) (A+B)+(C+D) carries with it a cycle type of Start and a routing field of "000" (LLL). The right source (to right MUX 640) (E+F)+(G+H) carries with it a cycle type of Normal and a routing field of "010". According to Table 4, the layer 3 result ((A+B)+(C+D))+((E+F)+(G+H)) would have a cycle type of Start and a routing field "000". The output control would direct the layer 3 result, according to Table 5, to the layer 3 FIFO 3L 686. The (I+0)+0 result in the FIFO 2L 684 would again be paired with a zero as the right source to the adder and control device 650, and thus, pass through unaltered, to the FIFO 3R 676. The result, (I+0)+0)+0, would carry a cycle type of End and a routing field of "001" (LLR).

The next add is the add on the bridge layer. The left source would be the result ((A+B)+(C+D))+((E+F)+(G+H)) stored in FIFO 3L 686 having a Start cycle type and routing field of 000. The right source would be the result (I+0)+0)+0 stored in the right FIFO 3R, having a routing field "001" (LLR). According to Table 4, the combination of a Start and End cycle type results in a Done cycle type. According to Table 5, the output control would direct the bridge layer add result to the result queue 660 whenever a "Done" cycle type is encountered. Thus, the adder and control device 650 would add ((A+B)+(C+D))+((E+F)+(G+H)) with (I+0)+0)+0 (or I) giving a result of ((A+B)+(C+D))+((E+F)+(G+H))+I and place the result into the result queue completing the accumulation of the first string. In a like manner, the accumulation of other strings through the various layers can be completed. The case of a string of length 1, as is depicted by the string containing only Q in FIG. 5, it would be coded with a cycle type of Done since it is both the start and end of the string.

The capacity of the memory banks 680 and 670 are a design choice and can be made to share a single large block of Random Access Memory or such. The latency through the adder and control device 650, the number of layers simulated by the PA 600, and the means of passing, storing the various control fields is also a matter of implementation and design choice.

Although the present invention has been described in detail with reference to the disclosed embodiments thereof, those skilled in the art will appreciate that various substitutions and modifications can be made to the examples described herein while remaining within the spirit and scope of the invention as defined in the appended claims. There are areas where those skilled in the arts may make changes and modifications and employ equivalents without departing from the spirit of the invention.

What is claimed is:

1. A method of constructing an accumulator, comprising:
   providing a summing control circuit to produce intermediate result data from initial inputs that are provided to inputs of said summing control circuit, wherein said summing control circuit comprises an adder and control device to perform adds of all layers of said layered tree structure;
   providing a left memory bank and a right memory bank;
   configuring logic circuits to store said intermediate result data in said left memory bank and in said right memory bank in a manner to simulate a layered tree structure;
   configuring said logic circuits to direct said intermediate result data and to direct said initial inputs from an arbitrary length string such that said accumulator maintains the order of operations within each simulated layer;
   providing a left source to said adder and control device wherein said left source is selected from among data of said left memory bank and one said initial input; and
   providing a right source to said adder and control device wherein said right source is selected from among data of said right memory bank and one said zero value,
   wherein said left and right sources are accompanied by control fields which control the flow of data, said control fields including, a cycle type, a routing field and a layer field.

2. A method according to claim 1 wherein said left memory bank and said right memory bank store every operational layer of said layered tree structure.

3. A method according to claim 2 wherein said implementing further includes:
   segregating said left memory bank into FIFOs, the FIFOs one more than the number of operational layers desired in said layered tree being simulated.

4. A method according to claim 2 wherein said implementing further includes:
   segregating said right memory bank into FIFOs, the FIFOs equal to the number of operational layers desired in said layered tree being simulated.

5. A method according to claim 1 wherein said left source and said right source are summed by said adder and control device, the result thereof directed to one of said left memory bank, said right memory bank and a result queue.

6. A method according to claim 1 wherein said control fields of said left source and said right source are combined to assign a single set of control fields to the resulting sum from said adder and control device.

7. A method according to claim 1 wherein said zero value is selected as said right source if said left source is to pass-through said adder and control device.

8. A method according to claim 1 wherein said initial input values are floating point in nature.

9. In an accumulator, a method of operating the accumulator to accumulate initial input values from an arbitrary N-length string, said method simulating a layered tree structure, comprising:
   streaming said initial input values in their original order to an input of said accumulator;
   selecting a left side source from among a zero value, said initial input values, or a set of intermediate result values;
   selecting a right side source from among a zero value, said initial input values or a set of intermediate result values;
   adding said left side source and said right side source to generate an adder output value; and
   directing said adder output value to one of a memory bank of said accumulator or a result queue of said accumulator, the final result accumulating all N said initial input values, wherein the order of adding is maintained within each said layer,
   wherein said streaming comprises:
     counting the phase of each initial input;
     passing directly without delay those initial inputs having an odd phase count; and
     delaying initial inputs having an even phase count, further wherein said delaying is such that said initial inputs having an even phase count are available to be accumulated contemporaneously with said initial inputs having an odd phase count.

10. A method according to claim 9 further comprising: assigning a set of control fields to each initial input value and to each adder output result value.

11. A method according to claim 10 wherein assigning includes:
    combining said control fields of said left source with the control fields of said right source according to a set of rules, the set of control fields resulting from said combining being assigned to said adder output result value.

12. A method according to claim 11 wherein said control fields include a cycle type, a routing field and a layer field.

13. A method according to claim 12 wherein said cycle type is one of a Start, End, Normal and Done types.

14. A method according to claim 12 further comprising:
    partitioning said memory bank into a right memory and left memory bank, each partition representing branches of said layered tree to right and left directions, respectively.

15. A method according to claim 14 wherein partitioning includes:
    segregating said right memory bank into FIFOs, the FIFOs equal to the number of operational layers desired in said layered tree being simulated; and
    segregating said left memory bank into FIFOs, the FIFOs one more than the number of operational layers desired in said layered tree being simulated.

16. A method according to claim 15 wherein said each FIFO of said left memory bank represents one of said operational layers and a bridge layer of said layered tree.

17. A method according to claim 15 wherein said each FIFO of said left memory bank represents one of said operational layers of said layered tree.

18. A method according to claim 17 wherein said routing field includes indications of which one of said FIFOs, at each layer, the data that accompanies it belongs.

19. A method according to claim 17 wherein said left and right source are at the same operational layer when being added except where a bridge layer add is performed.

20. A method according to claim 19 wherein said length N is allowed to be arbitrarily large by performing bridge layer adds for each of said initial input values exceeding the number allowed by said operational layers.

21. A method according to claim 9 wherein said initial input values are floating point in nature.

22. An apparatus configured to simulate a layered tree structure to accumulate initial input values from arbitrary N-length string, comprising:
   an input for receiving a stream of said N initial input values;
   a left input selector configured to select as a left input one of said initial input values or a left-side intermediate result value from among a plurality of left-side intermediate result values;
   a right input selector configured to select as a right input one of said initial input values or a right-side intermediate result value from among a plurality of right-side intermediate result values;
   an adder and control device configured to sum together said left input and said right input to produce a sum, said sum being determined to be a left-side intermediate result value, a right-side intermediate result values, or a final output that is representative of the accumulating of said N initial inputs, said adder and control device configured to direct the production of said sum in a manner to maintain the order of adds within each said layer;
   a left memory bank configured to store said left-side intermediate result values, wherein the input ports of said memory bank is coupled to said adder and control device, and the output ports of said memory bank are coupled right selection mechanism; and
   a right memory bank configured to store said left-side intermediate result values, wherein the input ports of said memory bank is coupled to said adder and control device, and the output ports of said memory bank are coupled to the right selection mechanism.

23. An apparatus according to claim 22 wherein said memory banks consist of a plurality of FIFOs.

24. An apparatus according to claim 23 wherein the FIFOs belonging to said left memory bank include a bridge layer FIFO.

25. An apparatus according to claim 22 further comprising:
   a phase counter configured to count said initial input values and configured to output a phase value for each said initial input value.

26. An apparatus according to claim 25 further comprising:
   a delay element coupled to said phase counter and said left input selection mechanism, configured to delay said initial input values that have an even number phase prior to being input to said left selection mechanism.

27. An apparatus according to claim 22 further comprising a result queue, said result queue to receive from the adder and control device said final output resulting from the accumulating of said N initial inputs.

28. An apparatus according to claim 24 wherein said left memory bank includes one FIFO for every operational layer in said tree structure.

29. An apparatus according to claim 28 wherein said right memory bank includes one FIFO for every operational layer in said tree structure.

30. An apparatus according to claim 22 wherein said initial input values are floating point in nature.

* * * * *